No. 762,226. PATENTED JUNE 7, 1904.
E. C. BLACKBURN.
NUT LOCK.
APPLICATION FILED MAR. 24, 1904.
NO MODEL.
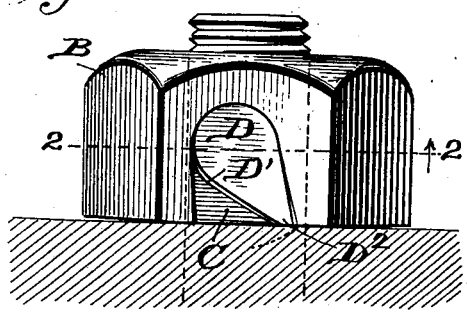
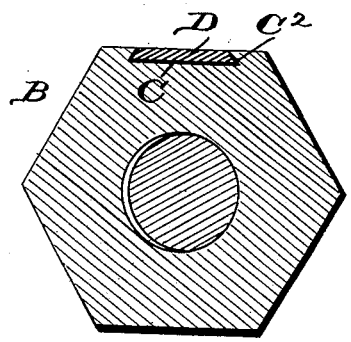
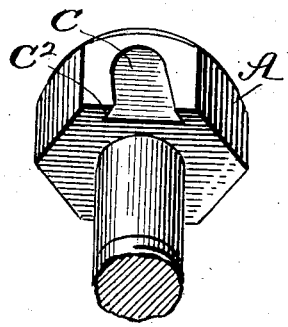
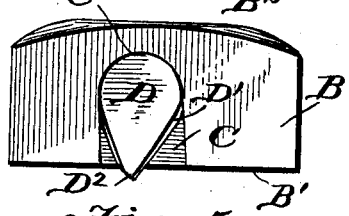
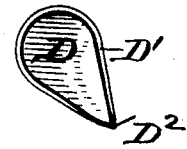
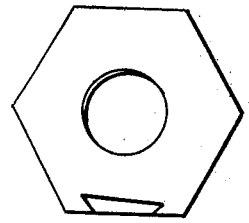
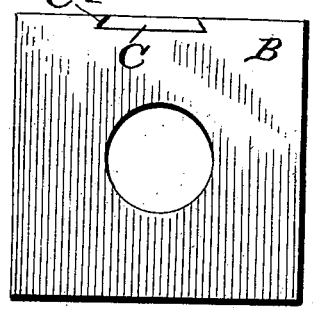
WITNESSES:
Jos. A. Ryan
Perry B. Turpin
INVENTOR
E. C. Blackburn.
BY Munn & Co.
ATTORNEYS
THE NORRIS PETERS CO., PHOTO-LITHO., WASHINGTON, D. C.

No. 762,226. Patented June 7, 1904.

UNITED STATES PATENT OFFICE.

ERNEST CROSLEY BLACKBURN, OF ASPEN, COLORADO, ASSIGNOR OF ONE-HALF TO HENRY HOSEY, OF ASPEN, COLORADO.

NUT-LOCK.

SPECIFICATION forming part of Letters Patent No. 762,226, dated June 7, 1904.

Application filed March 24, 1904. Serial No. 199,716. (No model.)

*To all whom it may concern:*

Be it known that I, ERNEST CROSLEY BLACKBURN, a citizen of the United States, and a resident of Aspen, in the county of Pitkin and State of Colorado, have made certain new and useful Improvements in Nut-Locks, of which the following is a specification.

My invention is an improvement in nut-locks, and particularly in nut-locks having pawl-plates and movably connected with the nut so they will rock into engagement with the abutment and lock the nut when the latter is turned home, the invention being especially designed, by reason of its cheapness and simplicity, for use on automobile-frames, locomotive-frames, structural iron-work, farming machinery, &c.; and the invention consists in certain novel constructions and combinations of parts, as will be hereinafter described and claimed.

In the drawings, Figure 1 is a side elevation of a nut provided with my improvement and applied as in use. Fig. 2 is a cross-section on about line 2 2 of Fig. 1. Fig. 3 is a detail perspective view of a bolt-head provided with a recess constructed according to my invention. Fig. 4 is a side elevation of a nut provided with my improvements. Fig. 5 is a bottom end view of such nut. Fig. 6 is a detail view of the pawl, and Fig. 7 is a bottom plan view of a nut having the inner wall of the recess inclined.

My invention is applicable to bolt-heads for locking bolts and nuts to turn on bolts, as will be understood from Figs. 3 and 4, and it will be understood in this connection that I regard the head A of the bolt as a fixed head and the head B in the form of a nut as a movable head for the bolt, so that in the use of the term "head" in the following specification and appended claims it should be understood that I mean to include both the fixed head A and the movable head B, the former being integral with the bolt and the latter being movable relatively thereto, it being threaded thereon in the usual manner.

The head is provided in one of its outer faces with a recess C, which extends from the inner end B' of the head toward the opposite or outer end B² of the head and terminates short of the outer end B² of the head, forming a recess which opens at the inner end B' of the head, as shown in the drawings. The outer end wall C' of the recess C is rounded and forms a pivot-seat against which turns the outer end of the pawl D, such end of the pawl being rounded to coincide with the wall C', as best shown in Fig. 4 of the drawings.

To avoid the necessity of separate fastenings and to make the pawl self-retaining in the recess in the head, as well as to brace the pawl from end to end within the recess C, I prefer to make the edge wall of said recess undercut, as shown at C², and to taper the outer edge of the pawl, as shown at D', to fit the undercut edges of the walls of the recesses C, so that the head and the pawl will be locked together in such manner as to prevent any displacement of the pawl. This construction is clearly shown in the drawings and will be understood from the foregoing description.

In operation when the head is drawn tightly against the abutment either by turning the movable head of the bolt or by drawing the fixed head against its abutment by the turning of a nut on the point end of the bolt the point D² of the pawl will be caused to bind against the abutment in such manner as to prevent any backward movement of the head, thus locking the nut firmly in position. The construction is simple, inexpensive, and can be easily applied and will operate efficiently for the purpose for which it is designed.

For working in close places pawl-recess C may be provided in two or more faces of a nut, the pawl fitting tightly in the recess in which it may be placed. In the use of the nut-lock the nut or bolt is screwed almost up. Then with a prick-punch a small dent is made in the abutment behind the pawl, the nut or bolt being screwed up until the point of the pawl is over the indentation, when the point of the pawl may be pushed into the indentation, locking the nut positively to the abutment, as will be understood from the accompanying drawings.

In Fig. 7 I show the base-wall of the recess at an angle to the face of the nut, and this may be preferred in some instances, as ordinarily the pawl when the point is stationary on the abutment would be drawn away from the wall of the recess, as the radius of the point where the pawl is at rest is greater than in the other position.

The base-wall of the recess may be made straight or parallel with the adjacent face of the nut, as shown in Fig. 2, or it may be inclined, as shown in Fig. 7.

Having thus described my invention, what I claim as new, and desire to secure by Letters Patent, is—

1. The improvement in nut and bolt locks herein described comprising a head provided in its outer face with a recess opening at the inner end of the head and terminating at its outer end short of the outer end of the head and having its said outer end rounded, the walls of said recess being undercut, and the pawl pointed at one end, rounded at its other end to coincide with the rounded outer end of the recess in the head and having its edges tapered to fit the undercut edge walls of such recess substantially as and for the purposes set forth.

2. In a nut and bolt lock, a head provided in its face with a recess adapted to form a pivotal seat for a locking-pawl and having its edge walls undercut, and a pawl having its edges formed to fit the undercut edges of the recess substantially as set forth.

3. The combination of an abutment, a bolt, a head on the bolt and held against the abutment, said head having in its outer face a recess opening at the inner end of the head and terminating at the opposite end short of the outer end of the head and having its outer end wall rounded and its walls undercut, and the pawl rounded at its outer end adapted at its other end to bind against the abutment and having its edges formed to fit the undercut walls of the recess in the head substantially as set forth.

ERNEST CROSLEY BLACKBURN.

Witnesses:
WM. S. PLATT,
J. B. HULL.